US 9,836,447 B2

(12) United States Patent
Cai et al.

(10) Patent No.: US 9,836,447 B2
(45) Date of Patent: *Dec. 5, 2017

(54) LINGUISTIC ERROR DETECTION

(71) Applicant: Microsoft Corporation, Redmond, WA (US)

(72) Inventors: Yizheng Cai, Sammamish, WA (US); Kevin Roland Powell, Kirkland, WA (US); Ravi Chandru Shahani, Bellevue, WA (US); Lei Wang, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/488,059

(22) Filed: Sep. 16, 2014

(65) Prior Publication Data

US 2015/0006159 A1 Jan. 1, 2015

Related U.S. Application Data

(63) Continuation of application No. 13/193,248, filed on Jul. 28, 2011, now Pat. No. 8,855,997.

(51) Int. Cl.
*G06F 17/27* (2006.01)
*G06F 17/28* (2006.01)

(52) U.S. Cl.
CPC .......... *G06F 17/273* (2013.01); *G06F 17/274* (2013.01); *G06F 17/275* (2013.01); *G06F 17/28* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................. 704/1, 9, 10
See application file for complete search history.

(56) References Cited

U.S. PATENT DOCUMENTS

| 4,730,269 | A | 3/1988 | Kucera |
| 4,771,401 | A | 9/1988 | Kaufman et al. |
| 4,868,750 | A | 9/1989 | Kucera et al. |
| 5,477,448 | A | 12/1995 | Golding et al. |
| 5,485,372 | A | 1/1996 | Golding et al. |
| 5,490,061 | A | 2/1996 | Tolin et al. |

(Continued)

OTHER PUBLICATIONS

Chodorow et al., (Chodorow, An Unsupervised Method for Detecting Grammatical Errors), 2000, Proceedings of the 1st North American chapter of the Association for Computational Linguistics conference, Association for Computational Linguistics, pp. 140-147.*

(Continued)

*Primary Examiner* — Lamont Spooner

(57) ABSTRACT

Potential linguistic errors within a sequence of words of a sentence are identified based on analysis of a configurable sliding window. The analysis is performed based on an assumption that if a sequence of words occurs frequently enough within a large, well-formed corpus, its joint probability for occurring in a sentence is very likely to be greater than the same words randomly ordered.

20 Claims, 6 Drawing Sheets

(56) References Cited

U.S. PATENT DOCUMENTS

| | | | |
|---|---|---|---|
| 5,537,317 A * | 7/1996 | Schabes | G06F 17/274 704/9 |
| 5,576,955 A * | 11/1996 | Newbold | G09B 7/04 715/212 |
| 5,577,249 A | 11/1996 | Califano | |
| 5,799,269 A * | 8/1998 | Schabes | G06F 17/274 704/9 |
| 5,845,306 A * | 12/1998 | Schabes | G06F 17/271 704/10 |
| 5,855,000 A | 12/1998 | Waibel et al. | |
| 6,064,959 A | 5/2000 | Young et al. | |
| 6,205,261 B1 | 3/2001 | Goldberg | |
| 6,401,060 B1 | 6/2002 | Critchlow et al. | |
| 6,424,983 B1 | 7/2002 | Schabes et al. | |
| 6,618,697 B1 | 9/2003 | Kantrowitz et al. | |
| 6,691,088 B1 * | 2/2004 | Blasig | G10L 15/197 704/240 |
| 6,816,830 B1 | 11/2004 | Kempe | |
| 7,120,582 B1 * | 10/2006 | Young | G10L 15/063 704/243 |
| 7,165,019 B1 | 1/2007 | Lee | |
| 7,366,983 B2 | 4/2008 | Brill | |
| 7,539,619 B1 | 5/2009 | Seligman | |
| 7,587,308 B2 | 9/2009 | Kasravi | |
| 7,680,649 B2 * | 3/2010 | Park | G06F 17/2755 704/1 |
| 7,702,512 B2 | 4/2010 | Gopinath et al. | |
| 7,809,744 B2 | 10/2010 | Nevidomski | |
| 7,835,902 B2 | 11/2010 | Gamon et al. | |
| 8,051,374 B1 * | 11/2011 | Shazeer | G06F 17/273 715/257 |
| 8,086,453 B2 | 12/2011 | Detlef et al. | |
| 8,170,868 B2 | 5/2012 | Gamon et al. | |
| 8,386,234 B2 | 2/2013 | Uchimoto et al. | |
| 2002/0128821 A1 | 9/2002 | Ehsani | |
| 2003/0036900 A1 | 2/2003 | Weise | |
| 2003/0120481 A1 * | 6/2003 | Murata | G06F 17/274 704/9 |
| 2003/0229497 A1 | 12/2003 | Wilson | |
| 2004/0024601 A1 | 2/2004 | Gopinath et al. | |
| 2004/0098263 A1 * | 5/2004 | Hwang | G10L 15/18 704/266 |
| 2004/0122656 A1 | 6/2004 | Abir | |
| 2004/0138881 A1 * | 7/2004 | Divay | G06F 17/2725 704/231 |
| 2005/0027512 A1 * | 2/2005 | Waise | G06F 17/2715 704/9 |
| 2005/0075877 A1 * | 4/2005 | Minamino | G10L 15/083 704/254 |
| 2006/0247912 A1 | 11/2006 | Suzuki et al. | |
| 2006/0277029 A1 | 12/2006 | Green et al. | |
| 2006/0277031 A1 * | 12/2006 | Ramsey | G06F 17/2765 704/9 |
| 2007/0112553 A1 * | 5/2007 | Jacobson | G06F 17/2827 704/2 |
| 2007/0219776 A1 | 9/2007 | Gamon et al. | |
| 2007/0271509 A1 * | 11/2007 | Abernethy | G06F 17/24 715/256 |
| 2008/0109209 A1 * | 5/2008 | Fraser | G06F 17/2827 704/4 |
| 2008/0162132 A1 * | 7/2008 | Doulton | G10L 15/265 704/235 |
| 2008/0221892 A1 * | 9/2008 | Nathan | G06F 17/279 704/257 |
| 2008/0270118 A1 | 10/2008 | Kuo | |
| 2009/0048833 A1 * | 2/2009 | Fritsch | G10L 15/1815 704/235 |
| 2010/0049498 A1 * | 2/2010 | Cao | G06F 17/30654 704/9 |
| 2010/0082348 A1 * | 4/2010 | Silverman | G10L 13/08 704/260 |
| 2010/0138210 A1 * | 6/2010 | Seo | G06F 17/2854 704/2 |
| 2010/0185435 A1 * | 7/2010 | Deshmukh | G09B 19/04 704/8 |
| 2010/0257593 A1 * | 10/2010 | Avelo | G06F 21/36 726/4 |
| 2011/0022380 A1 * | 1/2011 | Zaslavskiy | G06F 17/2818 704/4 |
| 2011/0087961 A1 | 4/2011 | Fitusi | |
| 2011/0161072 A1 * | 6/2011 | Terao | G06F 17/28 704/9 |
| 2011/0184723 A1 | 7/2011 | Huang et al. | |
| 2011/0202876 A1 | 8/2011 | Badger | |
| 2011/0224983 A1 * | 9/2011 | Moore | G06F 17/2715 704/240 |
| 2011/0282667 A1 | 11/2011 | Hernandez-Abrego | |
| 2011/0313757 A1 * | 12/2011 | Hoover | G06F 17/274 704/9 |
| 2012/0089387 A1 * | 4/2012 | Gamon | G06F 17/274 704/9 |
| 2012/0101804 A1 * | 4/2012 | Roth | G06F 17/2818 704/2 |
| 2012/0239379 A1 * | 9/2012 | Gershnik | G06F 17/275 704/8 |
| 2012/0256953 A1 * | 10/2012 | Meserth | G06F 17/30247 345/633 |
| 2013/0304453 A9 * | 11/2013 | Fritsch | G06F 17/2785 704/9 |

OTHER PUBLICATIONS

Wu et al., (Wu, Corpus-based Automatic Compound Extraction with Mutual Information and Relative Frequency Count), 1993, Proceedings of ROCLING VI, pp. 207-216.*
Kovacek, D. M., U.S. Notice of Allowance, U.S. Appl. No. 12/961,516, dated Dec. 5, 2015, pp. 1-13.
Kovacek, D., U.S. Office Action, U.S. Appl. No. 12/961,516, dated Jul. 5, 2013, pp. 1-16.
Kovacek, D., U.S. Final Office Action, U.S. Appl. No. 12/961,516, dated Dec. 5, 2013, pp. 1-22.
Kovacek, D., U.S. Office Action, U.S. Appl. No. 12/961,516, dated Mar. 20, 2015, pp. 1-19.

* cited by examiner

LINGUISTIC ERROR DETECTION

CROSS-REFERENCE TO RELATED APPLICATIONS

This application is a Continuation of U.S. patent application Ser. No. 13/193,248, filed on Jul. 28, 2011, and entitled "LINGUISTIC ERROR DETECTION."

BACKGROUND

Non-native English speakers may have trouble with writing sentences that, when read, sound like correct English. For example, the sentence, "Regarding to your request for a reference of Mrs. Green, please find following are her employment records," might be found confusing when read by a native English language speaker. More specifically, even though the grammar and/or spelling of this sentence may be valid, the meaning and intent of the sentence may be lost because of confusing wording. Accordingly, it is desirable to identify linguistic errors within a sequence of words.

SUMMARY

The present disclosure is directed to systems and methods for identifying and flagging potential linguistic errors within a sequence of words.

In one aspect, a method for detecting a linguistic error within a sequence of words of a sentence is disclosed. The method includes: receiving, from an application executing on a computing device, a plurality of tokens each forming a distinct feature of a first sentence within an electronic document; processing the plurality of tokens, at the computing device, to form at least one partition having at least three sequential tokens of the plurality of tokens; calculating, at the computing device, a first numerical value defined as a probability that the at least three sequential tokens will occur in sequence in a sentence; calculating, at the computing device, a second numerical value defined as a probability that the at least three sequential tokens will randomly occur in a sentence; calculating, at the computing device, a third numerical value based on a comparison of the first numerical value to the second numerical value; comparing the third numerical value to a first threshold value; and evaluating the at least three sequential tokens as having a potential linguistic error upon the third numerical value deviating from the first threshold value.

In another aspect, a computing device is disclosed including a processing unit and a system memory connected to the processing unit. The system memory includes instructions that, when executed by the processing unit, cause the processing unit to implement an error detection module configured to detect a linguistic error within a sequence of words of a sentence. The error detection module includes a classification module and a language model module. The classification module is configured to: receive, from an application executing on the computing device, a plurality of tokens each forming a feature of a first sentence within an electronic document of the application; process the plurality of tokens to form at least one partition having at least three sequential tokens of the plurality of tokens; calculate a first numerical value defined as a probability that the at least three sequential tokens will occur in sequence in a sentence; calculate a second numerical value defined as a probability that the at least three sequential tokens will randomly occur in a sentence; calculate a third numerical value based on a comparison of the first numerical value to the second numerical value; compare the third numerical value to a first threshold value; and evaluate the at least three sequential tokens as having a potential linguistic error upon the third numerical value deviating from the first threshold value. The language model module is configured as a data repository to store a statistical N-gram language model formed of a structured set of conditional probabilities assigned to single words and specific sequences of words as derived from a corpus of language text, where numerical values used in calculating the first and second numerical values are retrieved from the language model module by the classification module.

In yet another aspect, a computer readable storage medium having computer-executable instructions is disclosed that, when executed by a computing device, cause the computing device to perform steps including: receiving a command configured to instantiate linguistic error detection within at least three sequential tokens of a plurality of tokens each forming a word of a first sentence within an electronic document; parsing the plurality of tokens to form at least one partition having the at least three sequential tokens; calculating a first numerical value defined as a probability that the at least three sequential tokens will occur in sequence in a sentence, the first numerical value is calculated using a first equation having a form:

$$P(a,b,c,d,e,f,\ldots) = P(a)P(b|a)P(c|a,b)P(d|a,b,c)P(e|a,b,c,d)P(f|a,b,c,d,e) = P(a)P(b|a)P(c|a,b)P(d|b,c)P(e|c,d)P(f|d,e),$$

where terms having the form $P(a)$ within the first equation correspond to a uni-gram probability, terms having the form $P(b|a)$ within the first equation correspond to a bi-gram probability, and terms having the form $P(c|a,)$ within the first equation correspond to a tri-gram probability; calculating, a second numerical value defined as a probability that the at least three sequential tokens will randomly occur in a sentence, the second numerical value is calculated using a second equation having a form:

$$Q(a,b,c,d,e,f,\ldots) = P(a)P(b)P(c)P(d)P(e)P(f),$$

where terms having the form $P(a)$ within the second equation correspond to a uni-gram probability, and where numerical values used in calculating the first and second numerical values are retrieved from a statistical N-gram language model formed of a structured set of conditional probabilities assigned to single words and specific sequences of words as derived from a corpus of language text; calculating a third numerical value based on a comparison of the first numerical value to the second numerical value; evaluating the at least three sequential tokens as having a potential linguistic error upon the third numerical value deviating from a first threshold value and the second numerical value deviating from a second threshold value using an classification function having a form:

$$y = \begin{cases} 1 & \text{if } f(a,b,c,d,e,f,\ldots) < \theta \text{ and } \ln(Q(a,b,c,d,f,\ldots)) > \delta \\ 0 & \text{otherwise} \end{cases},$$

where the classification function evaluated as $y=1$ corresponds to the at least three sequential tokens as having a potential linguistic error; and emphasizing the at least three sequential tokens, when the classification function is evaluated as $y=1$, by at least one user perceivable cue selected from a group including: a visual cue; an audio cue; and a tactile cue.

This Summary is provided to introduce a selection of concepts, in a simplified form, that are further described below in the Detailed Description. This Summary is not intended to be used in any way to limit the scope of the claimed subject matter. Rather, the claimed subject matter is defined by the language set forth in the Claims of the present disclosure.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed to systems and methods for identifying and flagging potential linguistic errors within a sequence of words.

In one example embodiment, potential linguistic errors within a sequence of words of a sentence are identified based on analysis of a configurable sliding window. The analysis is performed based on an assumption that if a sequence of words occurs frequently enough within a large, well-formed corpus, its joint probability for occurring in a sentence is very likely to be greater than the same words randomly ordered.

Although not so limited, an appreciation of the various aspects of the disclosure will be gained through a discussion of the examples provided below.

Figure 1:
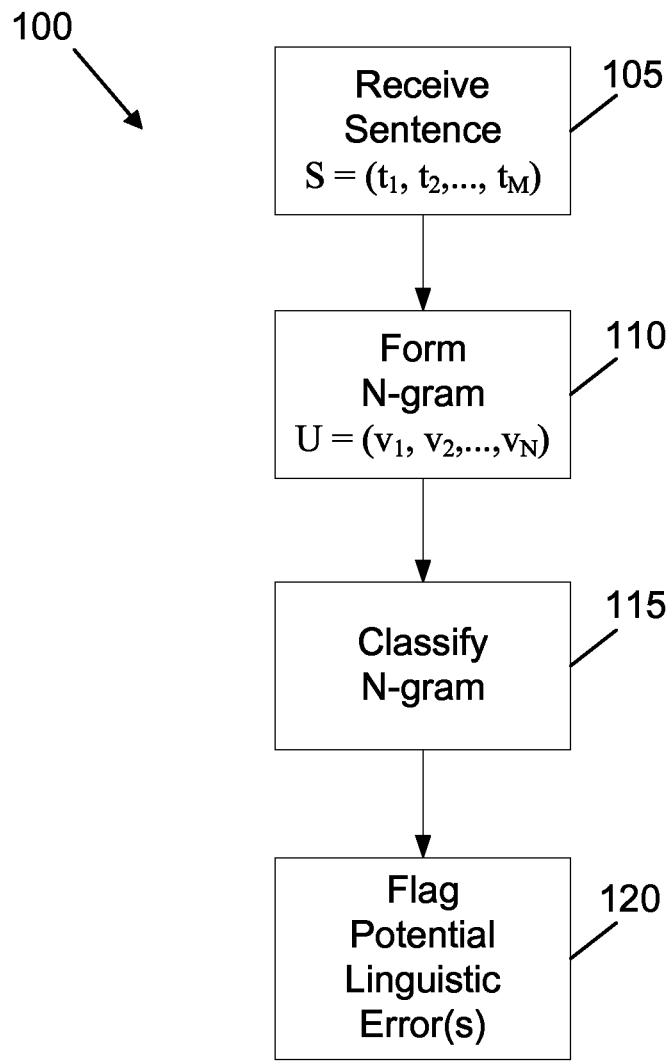
FIG. 1 shows a flowchart for an example method for identifying linguistic errors within a sequence of words.

Referring now to FIG. 1, an example method 100 for identifying a linguistic error within a sequence of words is shown. Example linguistic errors include phonological errors, lexical errors, syntactic errors, etc., and can generally be overt (i.e., context insensitive) or covert (i.e., context sensitive) in nature. In one embodiment, the method 100 is implemented on a client computing device, such as described below in connection with FIGS. 2-4. Other embodiments are possible.

The method 100 begins at a first module 105. The first module 105 is configured to receive a string of tokens that form at least a partially complete sentence $S=(t_1, t_2, \ldots, t_M)$. An example sentence $S_A$, in which M=13, includes: "One example algorithm determines a sequence of word whether contains a linguistic error." In this example, each individual token $(t_1, t_2, \ldots, t_{13})$ corresponds to a specific word of the sentence $S_A$. For example, token $t_4$="determines" and token $t_9$="whether." Other embodiments are possible. For example, a "token" can generally be any perceivable feature of a sentence, such as a syllable, phrase, punctuation mark, space delimiter, carriage return, and others. Still other embodiments are possible.

Operational flow then proceeds to a second module 110. The second module 110 is configured to logically partition the tokens $(t_1, t_2, \ldots, t_M)$ of the sentence S as received by the first module 105 to form an N-gram $U=(v_1, v_2, \ldots, v_N)$. An example N-gram $U_A=(v_1, v_2, \ldots, v_8)$, in which N=8, includes "algorithm determines a sequence of word whether contains." In this example, items $(v_1, v_2, \ldots, v_8)$ of the N-gram $U_A$ correspond to an ordered subset of the tokens $(t_3, t_4, \ldots, t_{10})$ of the sentence $S_A$. For example, item $v_1$=token $t_3$="algorithm" and item $v_7$=token $t_9$="whether." In general, items $(v_1, v_2, \ldots, v_N)$ of the N-gram U formed by the second module 110 correspond to an ordered set of the tokens $(t_1, t_2, \ldots, t_M)$ of the sentence S, where N is selectively defined as N≤M.

Operational flow then proceeds to a third module 115. The third module 115 is configured to quantify and compare the likelihood that the specific ordering of the items of the N-gram U formed by the second module 110 will occur in a sentence to the likelihood that the respective items will occur in random order.

For example, in one embodiment the third module 115 calculates and compares a probability P that quantifies the probability that the specific sequence "algorithm determines a sequence of word whether contains" of the N-gram $U_A$ will occur in a sentence to a probability Q that the respective items of the N-gram $U_A$ will occur in random order. In one example embodiment, the third module 115 evaluates the N-gram $U_A$ as potentially including a linguistic error when a ratio of the probability P and probability Q is less than unitary (i.e., ln(P/Q)<0). Other embodiments are possible.

Operational flow then proceeds to a fourth module 120. The fourth module 120 is configured to flag one or more specific items $(v_1, v_2, \ldots, v_N)$ of the N-gram U when at least one potential linguistic error is detected therein by the third module 115. For example, in one embodiment, the fourth module 120 flags the item $v_6$="word" and/or the item $v_7$="whether" of the N-gram $U_A$ since the item $v_6$="word" should potentially be of plural form, and the positioning of the item $v_7$="whether" within the N-gram $U_A$ may be incorrect.

One example implementation of the method 100 is described below in connection with FIGS. 2-6.

Figure 2:
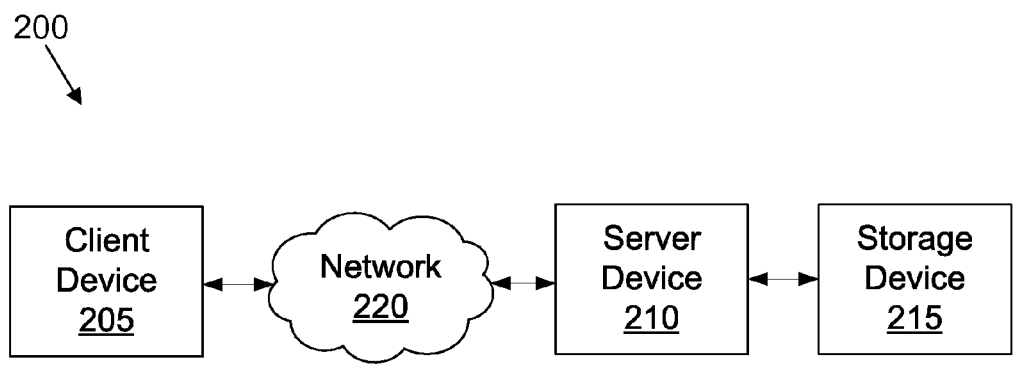
FIG. 2 shows an example networked computing environment.

Referring now to FIG. 2, an example networked computing environment 200 is shown in which aspects of the present disclosure, including the example method 100 of FIG. 1, may be implemented. The example environment 200 includes a client device 205, a server device 210, a storage device 215, and a network 220. Other embodiments are possible. For example, the environment 200 may generally include more or fewer devices, networks, and other components as desired.

The client device 205 and the server device 210 are computing devices, as described in further detail below in connection with FIG. 3. In example embodiments, the client device 205 is configured for identifying a linguistic error within a sequence of words in accordance with the present disclosure, and the server device 210 is configured as a business server that that implements business processes that are accessible to the client device 205. Other embodiments are possible.

The storage device 215 is an electronic data storage device, such as a relational database or any other type of persistent data storage device. The storage device 215 stores data in a predefined format such that the server device 210 can query, modify, and manage electronic data stored thereon. Example electronic data includes information related to directory services, authentication services, administration services, and other services such as managed by the ACTIVE DIRECTORY® directory service from Microsoft Corporation. Other embodiments of the storage device 215 are possible.

The network 220 is a bi-directional data communication path for data transfer between one or more devices. In the example shown, the network 220 establishes a communication path for data transfer between the client device 205 and the server device 210. The network 220 can be of any of a number of wireless or hardwired WAN, LAN, Internet, or other packet-based communication networks such that data can be transferred among the elements of the example environment 200. Other embodiments of the network 220 are possible as well.

Figure 3:
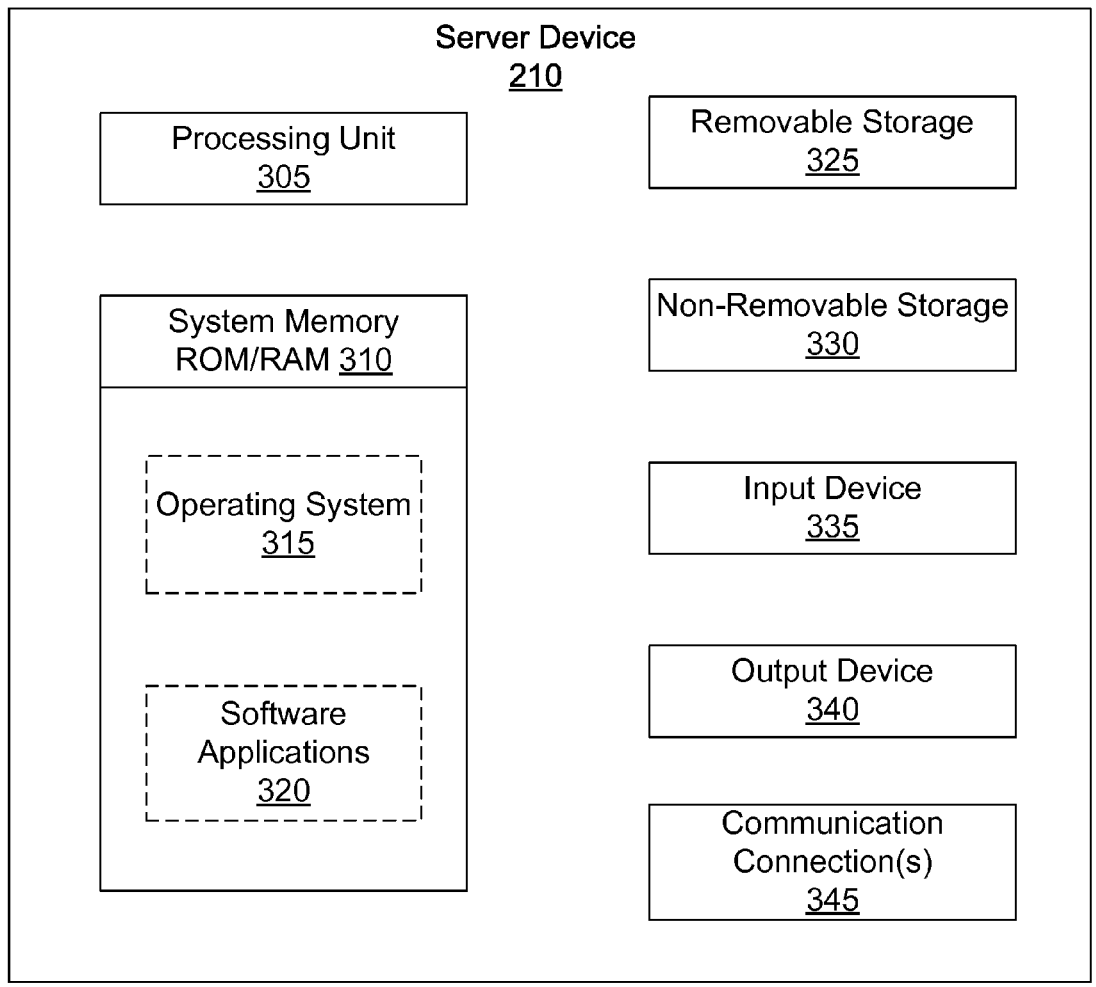
FIG. 3 shows an example computing device of the environment of FIG. 2.

Referring now to FIG. 3, the server device 210 of FIG. 2 is shown in detail. The server device 210 is a computing device. An example computing device includes an enterprise server, blade server, desktop computer, laptop computer, personal data assistant, smartphone, gaming console, and others.

The server device 210 includes at least one processing unit 305 and a system memory 310. The system memory 310 stores an operating system 315 for controlling the operation of the server device 210 or another computing device. One example operating system is the WINDOWS® operating system from Microsoft Corporation. Other embodiments are possible.

The system memory 310 includes one or more software applications 320 and may include program data. Software applications 320 may include many different types of single and multiple-functionality programs, such as a server program, an electronic mail program, a calendaring program, an Internet browsing program, a spreadsheet program, a program to track and report information, a word processing program, and many others.

One example program is the Office suite of business applications from Microsoft Corporation. Another example program includes Exchange Server, also from Microsoft Corporation. Exchange Server is an example of a business server that implements messaging and collaborative business processes in support of electronic mail, calendaring, and contacts and tasks features, in support of mobile and web-based access to information, and in support of data storage. Still other programs are possible.

The system memory 310 is computer-readable media. Examples of computer-readable media include computer storage media and communication media. Computer storage media is physical media that is distinguished from communication media.

Computer storage media includes physical volatile and nonvolatile, removable and non-removable media implemented in any method or technology for storage of information, such as computer-readable instructions, data structures, program modules, or other data. Computer storage media also includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the server device 210. Any such computer storage media may be part of or external to the server device 210. Such storage is illustrated in FIG. 3 by removable storage 325 and non-removable storage 330.

Communication media is typically embodied by computer-readable instructions, data structures, program modules, or other data, in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 210 also includes any number and type of an input device 335 and output device 340. An example input device 335 includes a keyboard, mouse, pen, voice input device, touch input device, motion input device, and others. For example, the input device 335 may be a camera that may be operative to record a user and capture motions and/or gestures made by a user. The input device 335 may be further operative to capture words spoken by a user, such as by a microphone, and/or capture other inputs from user such as by a keyboard and/or mouse. Consistent with embodiments of the present disclosure, the input device 335 may comprise any motion detection device capable of detecting the movement of a user. For example, the input device 335 may comprise a Kinect® motion capture device, from Microsoft Corporation, comprising a plurality of cameras and a plurality of microphones. Other embodiments are possible.

An example output device 340 includes a display, speakers, printer, and others. The server device 210 also includes a communication connection 345 configured to enable communications with other computing devices over a network (e.g., network 220 of FIG. 2) in a distributed computing system environment.

The client device 205 of FIG. 2 is also a computing device and is configured in a manner similar to that of the server device 210 described above. In example embodiments, the client device 205 is additionally configured for identifying a linguistic error within a sequence of words in accordance with the present disclosure.

Figure 4:
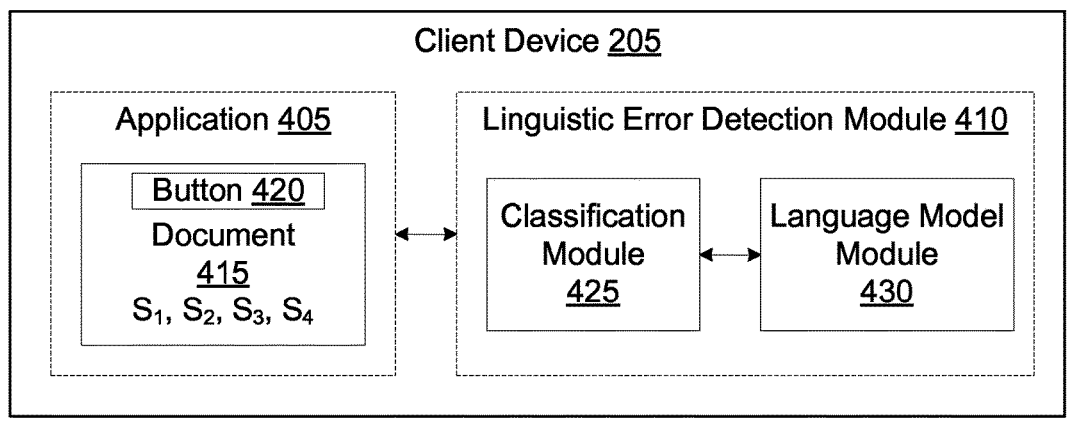
FIG. 4 shows example logical modules executing on a computing device configured for identifying linguistic errors within a sequence of words.

For example, referring now to FIG. 4, the client device 205 of FIG. 2 is shown including an application 405 and a linguistic error detection (LED) module 410. In example embodiments, the application 405 and LED module 410 each include logical modules of software executing on the client device 205. Other embodiments are possible. For example, in some embodiments, one or more respective components of the application 405 and LED module 410 are at least partially located on the server device 210, and are accessible to the client device 205 over the network 220 of FIG. 2. Still other embodiments are possible.

The application 405 is a program configured to enable a user to create, modify, and/or interact with a document 415. The Office suite of business applications from Microsoft Corporation is one example of such a program. In this example, the document 415 can be any one of an e-mail message, a spreadsheet file, a word processing file, etc. However, a type of the document 415 is only limited by a type of the application 405.

The document 415 as shown includes a plurality of sentences $S_1$-$S_4$. An example sentence $S_1$ includes: "They accept 48 hour deadline if translation the words up to 2,000." An example sentence $S_2$ includes: "I also ask you for giving me information about the time of the meetings of club's members." An example sentence $S_3$ includes: "Regarding to your request for a reference, please find following are the subjects employment records." An example sentence $S_4$ includes: "Finally, before we go to the camp I'd love to go to a big entertainment park cause we haven't any near in Greece."

While the sentences $S_1$-$S_4$ may exhibit approximately correct or even valid English grammar, the meaning and intent of the sentences $S_1$-$S_4$ may be lost because of confusing wording when read by a native English speaker. The application 405 is configured to invoke functionality of the LED module 410 to detect and flag such errors within the sentences $S_1$-$S_4$ of the document 415. In general, this enables an author of the sentences $S_1$-$S_4$ to proof the grammar and/or spelling of the sentences $S_1$-$S_4$.

Functionality of the LED module 410 may be manually invoked such as, for example, via user selection of a hotkey (e.g., "F7") of an input device (not shown) connected to the client device 205. In another embodiment, functionality of the LED module 410 may be manually invoked via user selection of a button 420 (e.g., via mouse pointer selection) within the document 415. Other embodiments are possible.

For example, the LED module 410 may be automatically invoked such as upon detection of a given punctuation mark (e.g., a "period") by the application 405 within the sentences $S_1$-$S_4$ of the document 415. For example, the LED module 410 may be automatically invoked by the application 405 when an author of the sentence $S_1$ completes the sentence with the "period" punctuation mark. Still other embodiments are possible.

The LED module 410 includes a classification module 425 and a language model (LM) module 430, and is generally configured to implement a linguistic error detection algorithm based on the conjecture that an N-gram will more likely be erroneous when a specific ordering of items of the N-gram (e.g., "algorithm determines a sequence of word whether contains") is not much different, in terms of probability, from the same items randomly organized (e.g., "word determines sequence contains a whether of algorithm").

Figure 5:
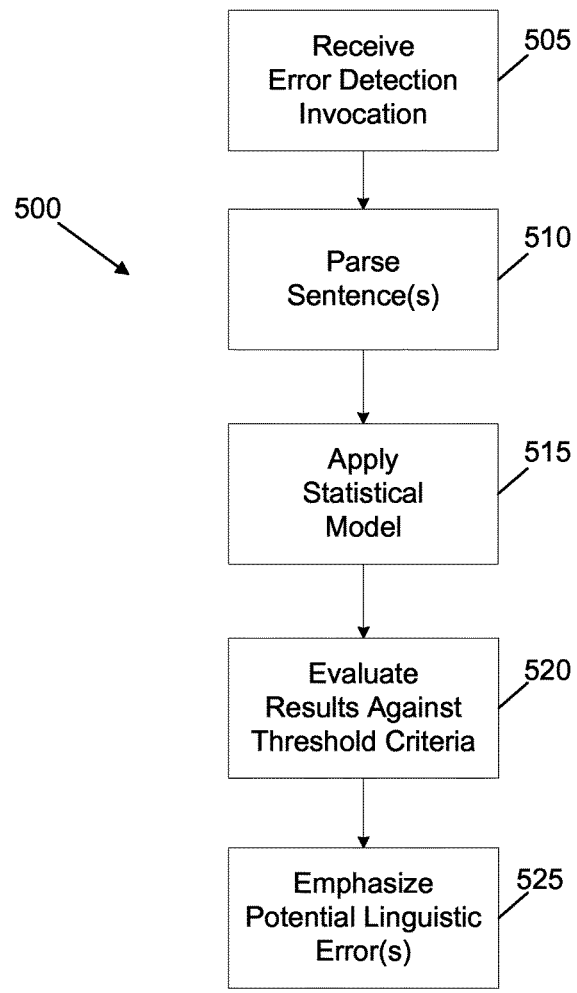
FIG. 5 shows a flowchart for an example method for identifying and flagging linguistic errors within a sequence of words.

For example, referring now additionally to FIG. 5, an example method 500 is shown for identifying and flagging potential linguistic errors within a sequence of words (i.e., N-gram) in a sentence. In general, the method 500 is implemented by the LED module 410 of FIG. 4 based on an assumption that if an N-gram occurs frequently enough within a large, well-formed corpus, its joint probability is very likely to be greater than the same words randomly ordered. An example corpus is described in further detail below.

The method begins at an operation 505. At operation 505, the classification module 425 of the LED module 410 receives a command to apply a statistical model to a sequence of words within at least one of the plurality of sentences $S_1$-$S_4$ to determine whether the particular sequence of words contains potential linguistic errors.

Operational flow then proceeds to an operation 510. At operation 510, the classification module 425 of the LED module 410 at least retrieves the sentence $S_1$ from the document 415, and forms a partition function $F=(F_1, \ldots, F_X)$ based on a configurable sliding window that defines a number of tokens T within the sentence $S_1$ that will be processed for error detection at any given time. In general, each respective partition $(F_1, \ldots, F_X)$ forms an N-gram that corresponds to an ordered set of tokens of the sentence $S_1$, and the number of tokens T is selectively defined as $T \geq 2$.

For example, assuming T is predefined as T=6, the example sentence $S_1$ is partitioned as $F=(F_1, \ldots, F_7)$, where $F_1$=(They accept 48 hour deadline if); $F_2$=(accept 48 hour deadline if translation); $F_3$=(48 hour deadline if translation the); $F_4$=(hour deadline if translation the words); $F_5$=(deadline if translation the words up); $F_6$=(if translation the words up to); and $F_7$=(translation the words up to 2,000). Other embodiments are possible.

Operational flow then proceeds to an operation 515. At operation 515, the classification module 425 is configured to calculate a log likelihood ratio for each N-gram defined by the respective partitions $(F_1, \ldots, F_7)$. For example, referring to partition $F_6$, a log likelihood ratio f(a, b, c, d, e, f) of the N-gram "if translation the words up to" is calculated using the Markov assumption and chain rule as follows.

$$P(a,b,c,d,e,f)=P(a)P(b|a)P(c|a,b)P(d|a,b,c)P(e|a,b,c,d)P(f|a,b,c,d,e)=P(a)P(b|a)P(c|a,b)P(d|b,c)P(e|c,d)P(f|d,e).$$

Equation 1

Element "a" corresponds to the item "if" within the partition $F_6$, element "b" corresponds to the item "translation" within the partition $F_6$, element "c" corresponds to the item "the" within the partition $F_6$, element "d" corresponds to the item "words" within the partition $F_6$, element "e" corresponds to the item "up" within the partition $F_6$, and element "f" corresponds to the item "to" within the partition $F_6$.

In contrast, with reference to partition $F_5$, element "a" corresponds to the item "deadline" within the partition $F_5$, element "b" corresponds to the item "if" within the partition $F_5$, element "c" corresponds to the item "translation" within the partition $F_5$, element "d" corresponds to the item "the" within the partition $F_5$, element "e" corresponds to the item "words" within the partition $F_5$, and element "f" corresponds to the item "up" within the partition $F_5$.

In example embodiments, the number of elements or arguments of the log likelihood ratio f( ) corresponds the number of tokens T. For example, when T=5, the log likelihood ratio is defined as f(a, b, c, d, e), etc.

Continuing with the example of partition $F_6$, the example function P(a, b, c, d, e, f) corresponds to a probability that the specific sequence "if translation the words up to" will occur in a sentence, and is simplified under the assumption that each word or item within the sentence $S_1$ depends only on the immediately preceding two words (i.e., "tri-gram model"). Other embodiments are possible. For example, the function P(a, b, c, d, e, f) can be selectively derived under the assumption that each word or item within the sentence $S_1$ depends on any number of preceding words (i.e., "multi-gram model"). In practice, the complexity of the function P(a, b, c, d, e, f) is only limited by completeness of a corresponding language model within the LM module 430, described in further detail below.

The term P(a) within the function P(a, b, c, d, e, f) corresponds to a uni-gram probability that the item "if" (i.e., a≡"if") would occur anywhere in a hypothetical sentence, the term P(b|a) corresponds to a bi-gram probability that the term "translation" (i.e., b≡"translation") would occur in a hypothetical sentence given that the term "if" occurs in sequence immediately before the term "translation" in the same sentence, and the term P(c|a,b) corresponds to a tri-gram probability that the item "the" (i.e., c≡"the") would occur in a hypothetical sentence given that the terms "if" and "translation" occur in sequence immediately before the term "the" in the same sentence. The terms P(d|b,c), P(e|c,d), and P(f|d, e) are also tri-gram probabilities determined in a manner similar to P(c|a,b).

$$Q(a,b,c,d,e,f)=P(a)P(b)P(c)P(d)P(e)P(f).$$

Equation 2

The example function Q(a, b, c, d, e, f) quantifies the probability that the items in the N-gram "if translation the words up to" will occur in random order based on the assumption that each of the corresponding elements (a, b, c, d, e, f) are independent variables. In this manner, the terms P(a), P(b), P(c), P(d), P(e), and P(f) within the function Q(a, b, c, d, e, f) represent a uni-gram probability that the corresponding item would occur anywhere in a hypothetical sentence.

$$f(a, b, c, d, e, f) = \ln \frac{P(a, b, c, d, e, f)}{Q(a, b, c, d, e, f)} = \quad \text{Equation 3}$$

$$\ln P(a, b, c, d, e, f) - \ln Q(a, b, c, d, e, f) =$$

$$\ln\left(\frac{P(a)P(b\mid a)P(c\mid a,b)P(d\mid b,c)}{P(e\mid c,d)P(f\mid d,e)}\right) -$$

$$\ln(P(a)P(b)P(c)P(d)P(e)P(f)) =$$

$$\ln P(a) + \ln P(b\mid a) + \ln P(c\mid a,b) + \ln P(d\mid b,c) +$$

$$\ln P(e\mid c,d) + \ln P(f\mid d,e) - \ln P(a) -$$

$$\ln P(b) - \ln P(c) - \ln P(d) - \ln P(e) - \ln P(f).$$

The example function f(a, b, c, d, e, f) quantifies a log likelihood ratio for the N-gram of partition $F_6$, and in the example embodiment may be calculated as:

ln $P(a)$=ln $P$(if)=−6.71605 ln $P(b)$=ln $P$(translation)=−11.919;

ln $P(c)$=ln $P$(the)=−3.10451;

ln $P(d)$=ln $P$(words)=−9.63201;

ln $P(e)$=ln $P$(up)=−6.53403;

ln $P(f)$=ln $P$(to)=−3.93333;

ln $P(b|a)$=ln $P$(translation|if)=−14.3737;

ln $P(c|a,b)$=ln $P$(the|if,translation)=−7.87373;

ln $P(d|b,c)$=ln $P$(words|translation,the)=−8.22497;

ln $P(e|c,d)$=ln $P$(up|the,words)=−8.80215; and ln $P(f|d,e)$=ln $P$(to|words,up)=−2.26877.

Numerical values used in calculating each of the respective natural log probabilities are retrieved from the LM module 430 by the classification module 425. In example embodiments, the LM module 430 is a repository comprising a statistical N-gram language model formed of a structured set of conditional probabilities assigned to single words and specific sequences of words as derived from a corpus of text. The N-gram language model additionally deals with issues such as "out-of-vocabulary terms." For example, if a specific N-gram is not present within the N-gram language model, a relatively small non-zero default value is used. An example of such a corpus of text includes a collection of phrases and terms generated by non-native English speakers. Other embodiments are possible.

Plugging the above-values into the function f(a, b, c, d, e, f), the log likelihood ratio for the N-gram "if translation the words up to" is evaluated as −6.42044. The log likelihood ratio for each N-gram defined by the respective partitions ($F_1$, . . . , $F_7$) are calculated in this manner.

Following calculation of the log likelihood ratio for each N-gram defined by the respective partitions ($F_1$, . . . , $F_7$) at operation 515, operational flow proceeds to an operation 520. At operation 520, values for f(a, b, c, d, e, f) and Q(a, b, c, d, e, f) for each of the partitions ($F_1$, . . . , $F_7$) are compared against a corresponding predetermined threshold value to verify the validity of the respective calculations.

$$y = \begin{cases} 1 & \text{if } f(a, b, c, d, e, f) < \theta \text{ and} \\ & \ln(Q(a, b, c, d, e, f)) > \delta \\ 0 & \text{otherwise} \end{cases} \quad \text{Equation 4}$$

The example classification function y is used to verify whether one or more of the partitions ($F_1$, . . . , $F_7$) includes at least one potential linguistic error. A given partition is evaluated as including at least one potential linguistic error when y is evaluated as 1. For example, the log likelihood ratio, evaluated as −6.42044, for the N-gram "if translation the words up to" of partition $F_6$, is compared to a first predetermined threshold value θ, and the natural log of the function Q(a, b, c, d, e, f), evaluated as −41.839 based on the above-example numerical values, is compared to a second predetermined threshold value δ.

In example embodiments, each of the first predetermined threshold value θ and the second predetermined threshold value δ are defined through a training process based on the structured set of conditional probabilities within the LM module 430. In other words, precisions and recall is measured using different threshold values to decide which values to use for a given application. Example values for the first predetermined threshold value θ and the second predetermined threshold value δ include "0" and "−45" respectively. In this example, the N-gram "if translation the words up to" is deemed to include at least one valid linguistic error (i.e., f(a, b, c, d, e, f)=−6.42044<θ=0 and ln Q(a, b, c, d, e, f)=−41.839>δ=−45).

Other embodiments are possible. For example, in some embodiments, the N-gram "if translation the words up to" is deemed to include at least one valid linguistic error upon only the numerical value of the function f(a, b, c, d, e, f) deviating from the first predetermined threshold value θ. Still other embodiments are possible.

Following evaluation of partition threshold criteria at operation 520, operational flow then proceeds to an operation 525 in which those specific partitions ($F_1$, . . . , $F_7$) evaluated as having one or more potential linguistic errors are flagged for user identification.

Figure 6:
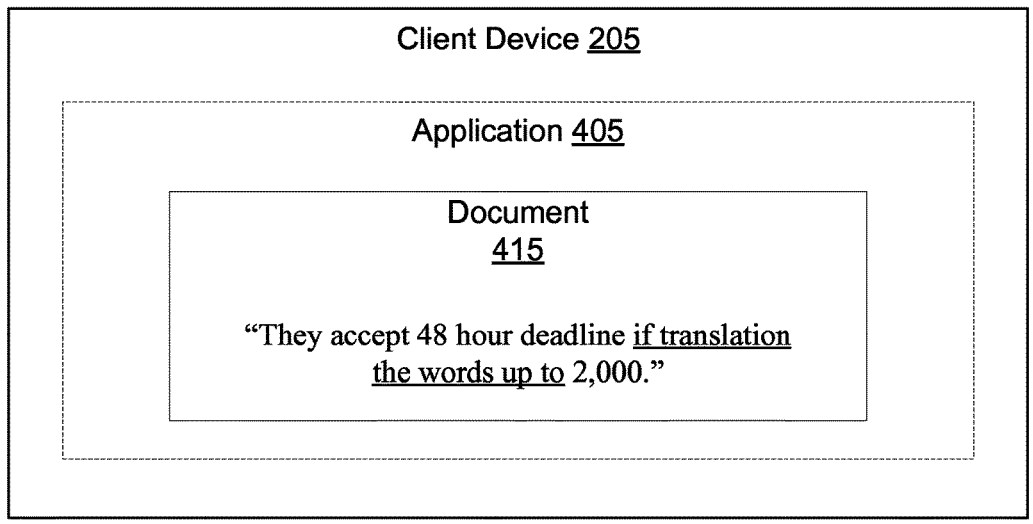
FIG. 6 shows an example sentence portion flagged for including a potential linguistic error.

For example, referring now additionally to FIG. 6, the example sentence $S_1$ is shown within document 415 in which the N-gram "if translation the words up to" of partition $F_6$ is underlined to indicate that a potential linguistic error exists within this phrase. Other embodiments are possible. For example, the subject phrase may be emphasized by any number of different perceivable cues that relay information to a user such as, for example, a visual cue (e.g., altered font size, color, underlining, etc. as rendered within document 415), an audio cue (e.g., system beep generated by client device 205, etc.), a tactile cue (vibration generated by client device 205, etc.), and others.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

In general, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

For example, embodiments of the present disclosure may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (e.g., "burned") onto the chip substrate as a single integrated circuit. When operating via an SOC, the functionality, described above, with respect to the present disclosure may be operated via application-specific logic integrated with other components of the computing device/system on the SOC. Other embodiments are possible.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for using a computing device to detect linguistic errors, comprising:
    selecting a sequence of three or more words in a phrase;
    applying a statistical language model to the selected sequence of three or more words to determine a first probability of occurrence of the selected sequence of three or more words in the phrase;
    applying the statistical language model to determine a second probability of occurrence of a random ordering of the words in the selected sequence of three or more words;
    calculating a numerical value by comparing the first probability of occurrence to the second probability of occurrence; and
    determining that the phrase contains a linguistic error when the calculated numerical value deviates from a first predetermined threshold and the second probability of occurrence deviates from a second predetermined threshold.

2. The method of claim 1 wherein the statistical language model is an N-gram language model formed of a structured set of conditional probabilities assigned to single words and to specific sequences of words as derived from a corpus of language text.

3. The method of claim 1 wherein determining the first probability of occurrence further comprises:
    evaluating a first word of the sequence of three or more words as a uni-gram probability;
    evaluating a second word of the sequence of three or more words as a bi-gram probability that assumes the first word immediately precedes the second word in the sequence of three or more words; and
    evaluating a third word of the sequence of three or more words as a tri-gram probability that assumes the first and second words occur in sequence and immediately precede the third word in the sequence of three or more words.

4. The method of claim 1 wherein the sequence of three or more words in the phrase is received from an electronic document provided via an input device.

5. The method of claim 4 further comprising emphasizing the sequence of three or more words within the electronic document upon determining that the phrase contains a linguistic error.

6. The method of claim 4 wherein the electronic document is provided via a voice input device.

7. The method of claim 4 wherein selecting the sequence of three or more words in the phrase of the electronic document is performed via a configurable sliding window that defines a number of words that will be processed to determine whether the phrase contains a linguistic error.

8. The method of claim 1, further comprising receiving user specification defining the sequence of three or more words in the phrase.

9. The method of claim 1 wherein calculating the numerical value comprises using at least another numerical value stored in the statistical language model.

10. A computing device, comprising:
    a processing unit; and
    a system memory connected to the processing unit, the system memory including instructions that, when executed by the processing unit, cause the processing unit to implement an error detection module configured to detect a linguistic error, wherein the error detection module comprises:
        a classification module configured to:
            receive, from an application executing on the computing device, a sequence of three or more words within an electronic document of the application;
            apply a statistical language model to the selected sequence of three or more words to determine a first probability of occurrence of the selected sequence of three or more words;
            apply the statistical language model to determine a second probability of occurrence of a random ordering of the words in the selected sequence of three or more words;
            calculate a numerical value by comparing the first probability of occurrence to the second probability of occurrence; and
            determine that the sequence of three or more words contains a linguistic error when the calculated numerical value deviates from a first predetermined threshold and the second probability of occurrence deviates from a second predetermined threshold.

11. The computing device of claim 10 wherein the statistical language model is an N-gram language model formed of a structured set of conditional probabilities assigned to single words and to specific sequences of words as derived from a corpus of language text.

12. The computing device of claim 10 further comprising highlighting the sequence of three or more words within the electronic document when it is determined that the sequence of three or more words contains a linguistic error.

13. The computing device of claim 10 further comprising providing a tactile cue when it is determined that the sequence of three or more words contains a linguistic error.

14. The computing device of claim 10 further comprising providing an audio cue when it is determined that the sequence of three or more words contains a linguistic error.

15. The computing device of claim 10 wherein the electronic document is provided via a voice input device that captures spoken words.

16. The computing device of claim 10 wherein the sequence of three or more words is selected via a configurable sliding window over the electronic document.

17. A computer readable hardware storage device having computer-executable instructions that, when executed by a computing device, cause the computing device to perform steps comprising:
- sequentially selecting sequences of three or more words within an electronic document via a configurable sliding window;
- applying a statistical language model to each selected sequence of three or more words to determine a first probability of occurrence of the selected sequence of three or more words;
- applying the statistical language model to determine a second probability of occurrence of a random ordering of the words in each selected sequence of three or more words;
- calculating a numerical value by comparing the first probability of occurrence to the second probability of occurrence; and
- determining that any of the sequences of three or more words contains a linguistic error when the calculated numerical value is less than a first predetermined threshold and the second probability of occurrence is greater than a second predetermined threshold.

18. The computer readable hardware storage device of claim 17 wherein the statistical language model is an N-gram language model formed of a structured set of conditional probabilities assigned to single words and to specific sequences of words as derived from a corpus of language text.

19. The computer readable hardware storage device of claim 17 further comprising steps for emphasizing each sequence of three or more words that is determined to contain a linguistic error.

20. The computer readable hardware storage device of claim 17 further comprising steps for receiving the electronic document via a voice input device that captures spoken words.

* * * * *